United States Patent
Carter

[19]

[11] Patent Number: 6,102,546
[45] Date of Patent: Aug. 15, 2000

[54] REARVIEW MIRROR BEZEL HAVING REDUCED APPARENT SIZE

[75] Inventor: John W. Carter, Holland, Mich.

[73] Assignee: Gentex Corporation, Zeeland, Mich.

[21] Appl. No.: 09/282,942

[22] Filed: Apr. 1, 1999

[51] Int. Cl.[7] ................................... G02B 5/08
[52] U.S. Cl. .................. 359/604; 359/601; 359/603; 359/608; 359/610; 359/273
[58] Field of Search ................... 359/604, 601, 359/603, 608, 610, 267, 275, 273

[56] References Cited

U.S. PATENT DOCUMENTS

| | | |
|---|---|---|
| 4,646,210 | 2/1987 | Skogler et al. . |
| 4,733,336 | 3/1988 | Skogler et al. . |
| 4,807,096 | 2/1989 | Skogler et al. . |
| 4,902,108 | 2/1990 | Byker . |
| 4,917,477 | 4/1990 | Bechtel et al. . |
| 5,066,112 | 11/1991 | Lynam et al. . |
| 5,128,799 | 7/1992 | Byker . |
| 5,151,824 | 9/1992 | O'Farrell . |
| 5,202,787 | 4/1993 | Byker et al. . |
| 5,204,778 | 4/1993 | Bechtel . |
| 5,278,693 | 1/1994 | Theiste et al. . |
| 5,280,380 | 1/1994 | Byker . |
| 5,282,077 | 1/1994 | Byker . |
| 5,285,060 | 2/1994 | Larson et al. . |
| 5,294,376 | 3/1994 | Byker . |
| 5,448,397 | 9/1995 | Tonar . |
| 5,451,882 | 9/1995 | Bechtel et al. . |
| 5,481,395 | 1/1996 | Byker . |
| 5,504,478 | 4/1996 | Knapp . |
| 5,537,003 | 7/1996 | Bechtel et al. . |
| 5,659,423 | 8/1997 | Schierbeek et al. ............... 359/604 |
| 5,666,028 | 9/1997 | Bechtel et al. . |
| 5,679,283 | 10/1997 | Tonar et al. . |
| 5,682,267 | 10/1997 | Tonar et al. . |
| 5,689,370 | 11/1997 | Tonar et al. . |
| 5,818,625 | 10/1998 | Forgette et al. . |

Primary Examiner—Cassandra Spyrou
Assistant Examiner—Mohammad Y. Sikder
Attorney, Agent, or Firm—Alan G. Towner; Eckert Seamans Cherin & Mellot, LLC

[57] ABSTRACT

Electrochromic rearview mirrors having reduced apparent size bezels are disclosed. Visual characteristics of the bezel, such as lightness value, are controlled in order to reduce the apparent size of the bezel. The lightness value of the bezel is preferably matched to the lightness value of the electrochromic mirror. In addition, the color value of the bezel may also be controlled. The electrochromic rearview mirrors may be mounted in the interior or on the exterior of vehicles.

60 Claims, 4 Drawing Sheets

REARVIEW MIRROR BEZEL HAVING REDUCED APPARENT SIZE

FIELD OF THE INVENTION

The present invention relates to vehicle rearview mirrors, and more particularly to electrochromic rearview mirrors having bezels of reduced apparent size.

BACKGROUND INFORMATION

Many types of vehicles such as cars and trucks have rearview mirrors mounted inside and/or outside of the vehicle. Recently, electrochromic rearview mirrors have been developed which automatically change from a high reflectance mode during the day to a lower reflectance mode during the night for glare reduction. Electrochromic rearview mirrors typically comprise a relatively thin electro-optic medium sandwiched and sealed between two glass elements. In most assemblies, when the electro-optic medium is electrically energized, it darkens and absorbs an increasing amount of light as the applied voltage is increased. When the electrical voltage is removed, the mirror returns to its high transmittance state. Examples of such automatic rearview mirrors are disclosed in U.S. Pat. Nos. 4,902,108, 4,917,477, 5,128,799, 5,202,787, 5,204,778, 5,278,693, 5,280,380, 5,282,077, 5,285,060, 5,294,376, 5,682,267, 5,689,370, 5,448,397, 5,451,822 and 5,818,625, each of which is assigned to the assignee of the present invention and each of which is incorporated herein by reference.

Typically, the electrochromic medium sandwiched and sealed between the two glass elements is comprised of a solution-phase, self-erasing system of electrochromic materials. However, other electrochromic media may be utilized, including an approach wherein a tungsten oxide electrochromic layer is coated on one electrode with a solution containing a redox active material to provide the counter electrode reaction. When operated automatically, the rearview mirrors may incorporate light-sensing electronic circuitry which is effective to change the mirrors to the reduced reflectance modes when glare inducing light is detected, the sandwiched electrochromic medium being activated and the mirror being reduced in proportion to the amount of glare inducing light that is detected. As glare inducing light subsides, the mirror automatically returns to its normal high reflectance state without any action being required on the part of the driver of the vehicle.

The electrochromic medium is typically disposed in a sealed chamber defined by a transparent front glass element, a peripheral edge seal, and a rear mirror element having a reflective layer. Conductive layers are provided on the inside of the front and rear glass elements, the conductive layer on the front glass element being transparent while the conductive layer on the rear glass element may be transparent or may be semi-transparent or opaque and may also have reflective characteristics and function as the reflective layer for the mirror assembly. The front surface of the front glass element is sometimes referred to as the first surface, and the inside surface of the front glass element is sometimes referred to as the second surface. The inside surface of the rear glass element is sometimes referred to as the third surface while the back surface of the rear glass element is sometimes referred to as the fourth surface. Conductive clips positioned at the edges of the glass elements are typically used to impart a potential from a power supply to the conductive materials. The clips are connected to electronic circuitry which electrically energizes the electrochromic medium to switch the mirror to decreased reflectance modes when glare inducing light is detected and thereafter allow the mirror to return to the high reflectance mode when the glare inducing light subsides.

The bezels of conventional electrochromic mirrors have typically been designed to be large enough to conceal the sealing member, the conductive clips, the edges of the glass elements, and any other components of the assembly which extend beyond the reflective area of the mirror element, for functional and aesthetic purposes.

Attempts have been made to reduce the width of the bezel, as it may appear cumbersome or distracting. Although physical size reduction remains a goal, there are limiting factors as to how narrow an electrochromic mirror bezel can become and still perform its function.

The present invention seeks to reduce the apparent size of electrochromic mirror bezels. Matching the visual characteristics of such bezels to their surroundings can help to hide the bezels and reduce their visual impact and the perceived size of the bezels, for example, by creating the illusion of extending the mirror surface beyond its actual dimensions into the bezel area.

SUMMARY OF THE INVENTION

An aspect of the present invention is to provide an electrochromic rearview mirror including a variable reflectance electrochromic mirror assembly switchable from a high reflectance mode to at least one reduced reflectance mode, and a reduced apparent size bezel having a controlled lightness value at least partially surrounding the electrochromic mirror assembly.

Another aspect of the present invention is to provide an electrochromic rearview mirror including a variable reflectance electrochromic mirror assembly switchable from a high reflectance mode to at least one reduced reflectance mode, and a reduced apparent size bezel at least partially surrounding the electrochromic mirror assembly, wherein the lightness value of the bezel substantially matches the lightness value of the electrochromic mirror assembly.

A further aspect of the present invention is to provide a reduced apparent size bezel having a controlled lightness value for an electrochromic mirror.

These and other aspects of the present invention will be more apparent from the following description.

DETAILED DESCRIPTION

Figure 1:
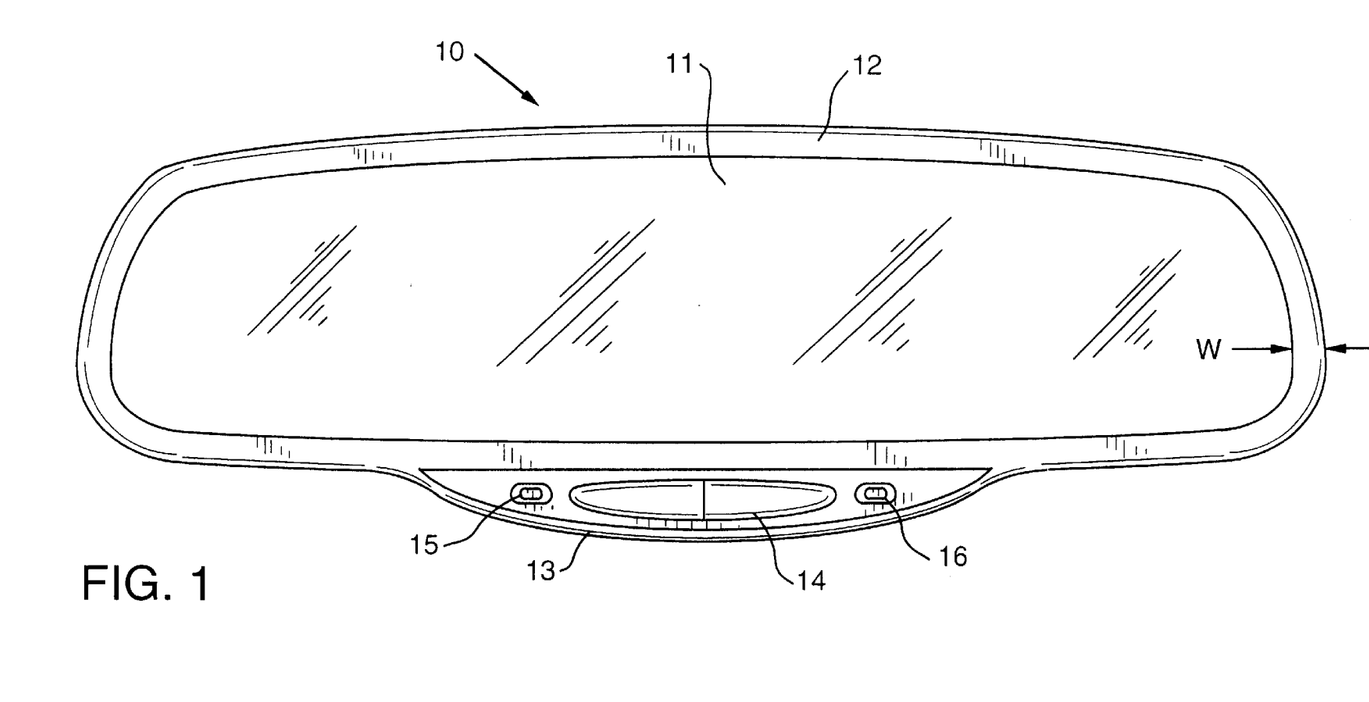
FIG. 1 is a front elevational view of an interior electrochromic rearview mirror including a reduced apparent size bezel in accordance with an embodiment of the present invention.

FIG. 1 is a front elevational view of an electrochromic rearview mirror 10 which may be mounted in the interior of a vehicle. The rearview mirror 10 includes a mirror surface 11 surrounded by a reduced apparent size bezel 12 in accordance with the present invention. The bezel 12 has a width W. A chin 13 may be located at the bottom of the bezel 12. A switch 14 may be provided inside the chin 13 in order to turn the automatic electrochromic rearview mirror 10 on or off. A conventional light sensor 15 may be located in the chin 13, or at any other suitable location. In addition, an indicator 16 located in the chin 13 may be used to indicate whether the electrochromic rearview mirror 10 is on or off.

Figure 2:
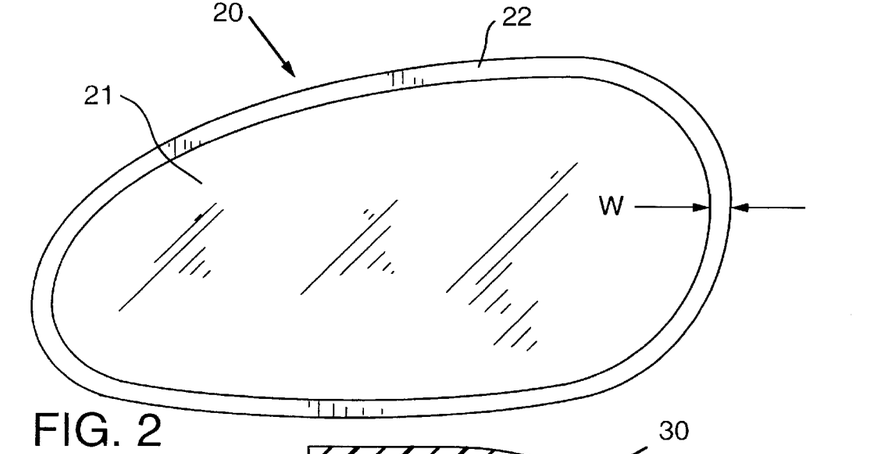
FIG. 2 is a front elevational view of an exterior electrochromic rearview mirror including a reduced apparent size bezel in accordance with another embodiment of the present invention.

FIG. 2 is a front elevational view of an electrochromic rearview mirror 20 which may be mounted on the exterior of a vehicle. The rearview mirror 20 includes a mirror surface 21 surrounded by a reduced apparent size bezel 22 in accordance with the present invention. The bezel 22 has a width W.

Figure 3:
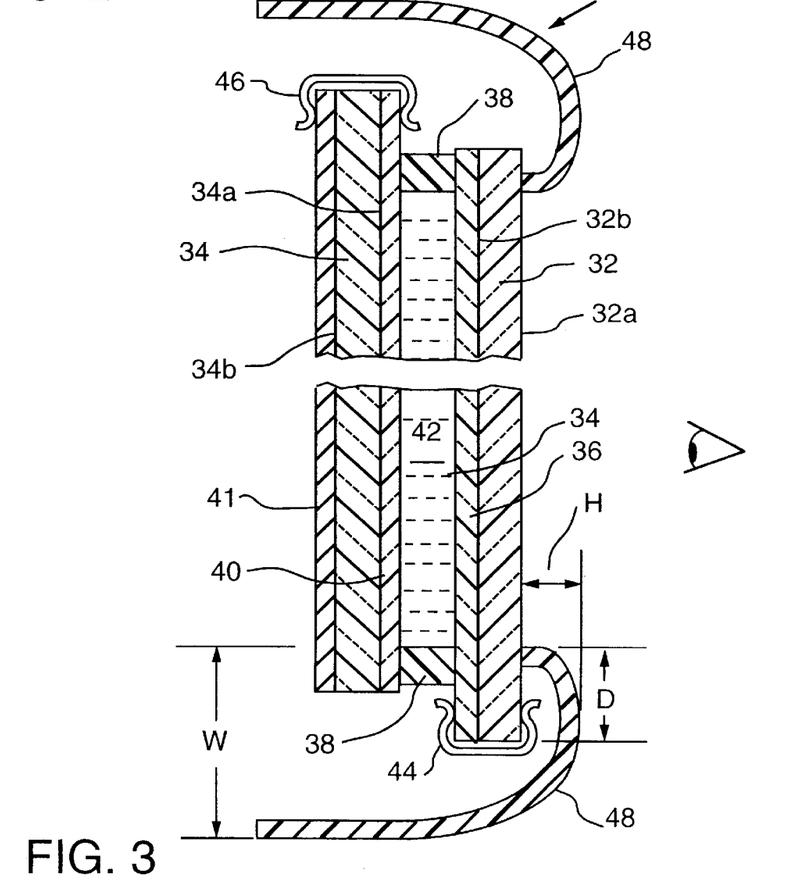
FIG. 3 is a partially schematic cross-sectional view of an electrochromic rearview mirror having a reduced apparent size bezel in accordance with an embodiment of the present invention.

FIG. 3 is a partially schematic cross-sectional view of an electrochromic interior or exterior rearview mirror 30 of the present invention. The rearview mirror 30 has a front transparent element 32 having a front surface 32a and a rear surface 32b, and a rear element 34 having a front surface 34a and a rear surface 34b. Since some of the layers of the device are very thin, FIG. 3 is not drawn to scale for pictorial clarity. The front surface 32a of the front glass element may be referred to as the first surface, and the back surface 32b of the front glass element as the second surface. The front surface 34a of the rear glass element may be referred to as the third surface, and the back surface 34b of the rear glass element as the fourth surface.

The front transparent element 32 may be made of any material which is transparent and has sufficient strength to operate in conditions such as varying temperatures commonly found inside and/or outside of the vehicles on which the electrochromic mirrors are mounted. For example, in the automotive environment the temperature may vary from −40° C. to over 100° C. The front element 32 may comprise glass such as borosilicate glass, soda lime glass or float glass, or any other material such as a polymer or plastic that is transparent in the visible region of the electromagnetic spectrum.

The front element 32 is preferably a sheet of glass with a thickness ranging from about 1.1 mm to about 2.2 mm. The rear element 34 preferably meets the operational conditions outlined above, except the rear element 34 does not need to be transparent, and therefore may comprise polymers, metals, glass, ceramics or the like. The rear element 34 preferably comprises a sheet of glass with a thickness ranging from about 1.1 mm to about 2.2 mm.

One or more layers of a transparent, electrically conductive material 36 are deposited on the second surface 32b to act as an electrode. The transparent conductive material 36 may be any material which: bonds well to front element 32 and maintains this bond when a sealing member 38 such as an epoxy seal bonds thereto; is resistant to corrosion with the other materials within the electrochromic device; and has minimal diffuse or specular reflectance, high light transmission, neutral coloration and good electrical conductance. The transparent conductive material 36 may comprise any suitable material such as fluorine-doped tin oxide (FTO); tin-doped indium oxide (ITO); a stack of FTO/ITO; or a stack of ITO/metal/ITO (IMI). Similar materials may be deposited onto the third surface 34a, for example, another layer of transparent, electrically conductive material 40 for mirrors with a fourth surface reflector 41, or a combined reflector/electrode.

The coating 40 of the third surface 34a is sealably bonded to the coating 36 on the second surface 32b near their outer perimeters by the sealing member 38. Preferably, sealing member 38 contains glass beads (not shown) to hold the transparent elements 32 and 34 in a parallel and spaced apart relationship while the seal material cures. The sealing member 38 may be any material which is capable of adhesively bonding to the coatings on the second surface 32b to the coatings on the third surface 34a to seal the perimeter such that the electrochromic material 44 does not leak from the device, while maintaining a generally constant distance therebetween.

A chamber 42 filled with a suitable electrochromic compound is defined by the transparent conductive material 36 (disposed on the second surface 32b), another layer disposed on the third surface 34a comprising either a transparent conductive material 40 or a combination reflector/electrode, and an inner circumferential wall of the sealing member 38. Electrically conductive clips 44 and 46 contact the conductive layers 36 and 40, respectively.

A reduced apparent size bezel 48 extends around the edge of the electrochromic mirror 30 and comes into contact with the first surface 32a, preferably at a point such that the seal member 38 is substantially hidden from view. The bezel has a total width W. The front and rear elements 32 and 34 of the electrochromic mirror 30 are typically offset in order to allow electrical contact with the conductive coatings 36 and 40 covering the elements. This offset, in combination with the requirement for concealing the seal element 38, causes the total width W of the bezel 48 to be relatively large. Typically, the total width W is from about 4 to about 10 mm, more typically from about 5.5 to about 8 mm. The bezel 48 also has an overlap distance D extending from the edge of the front element 32 across its front surface 32a. The overlap distance D is typically from about 1 to about 8 mm, more typically from about 2 to about 5 mm. The bezel 48 further has a height H extending from the front surface 32a. The height H is typically from about 0.5 to about 5 mm, more typically from about 1 to about 3 mm.

When viewed from the front as shown in FIG. 3, the apparent size of the bezel 48 is reduced in accordance with the present invention by controlling the visual characteristics of the bezel. The reflectance and color of the bezel 48 are controlled in order to reduce its apparent size. In a preferred embodiment, the reflectance or lightness value of the bezel 48 is controlled in order to substantially match the reflectance or lightness value of the electrochromic mirror 30 when the mirror is in the high reflectance mode. While the mirror 30 comprises a specular imaging surface, the bezel 48 may comprise a diffuse surface, or may alternatively comprise a specular imaging surface. Although matching of the visual characteristics of the bezel to an electrochromic mirror is primarily described herein, in an alternative embodiment the visual characteristics of the bezel may be matched to a standard rearview mirror.

Based upon the conventional CIELAB color scale, the rearview mirror bezels of the present invention preferably have reflectance or lightness values (L*) of from about 30 to about 100, based upon a scale of 0 (black) to 100 (white).

More preferably, the rearview mirror bezels have L* values of from about 40 to about 90, most preferably from about 50 to about 80. Typically, the L* value of the electrochromic mirror in the high reflectance mode is from about 75 to about 96, while the L* value of the electrochromic mirror in the lowest reflectance mode is from about 25 to about 54.

The maximum difference between the lightness value L* of the bezel and the lightness value L* of the electrochromic mirror assembly in the high reflectance mode is typically less than about 35. Preferably, the maximum difference between the lightness value L* of the bezel and the lightness value L* of the electrochromic mirror assembly in the high reflectance mode is less than about 30, more preferably less than about 20. In one preferred embodiment, the maximum difference between the lightness value L* of the bezel and the lightness value L* of the electrochromic mirror assembly in the high reflectance mode is 10, with a maximum difference of about 5 being particularly preferred. Preferably, the ratio of the lightness value L* of the bezel to the lightness value L* of the electrochromic mirror assembly in the high reflectance mode is from about 0.6:1 to about 1.3:1. More preferably the ratio of the lightness value L* of the bezel to the lightness value L* of the electrochromic mirror assembly in the high reflectance mode is from about 0.8:1 to about 1:1.

In addition to controlling lightness values, the CIELAB red/green color value (a*) and the yellow/blue color value (b*) may be controlled in order to provide the desired visual characteristics. In accordance with the CIELAB color scale, a* values range from −60 (green) to +60 (red), while b* values range from −60 (blue) to +60 (yellow). In a preferred embodiment, the a* and b* values may be controlled in order to substantially match the corresponding color values of the electrochromic mirror. For example, the a* and b* color values may be relatively close to zero, e.g., from about −10 to about +10. In another embodiment, the a* and/or b* color values may be of relatively high absolute value, e.g., from about 10 to about 50 in absolute value.

The reduced apparent size bezels of the present invention may be made of any suitable material including polymers such as ASA/PC, ABS/PC, PC, ABS, PA, PPO and reinforced polymers, and metal alloys.

Figure 4:
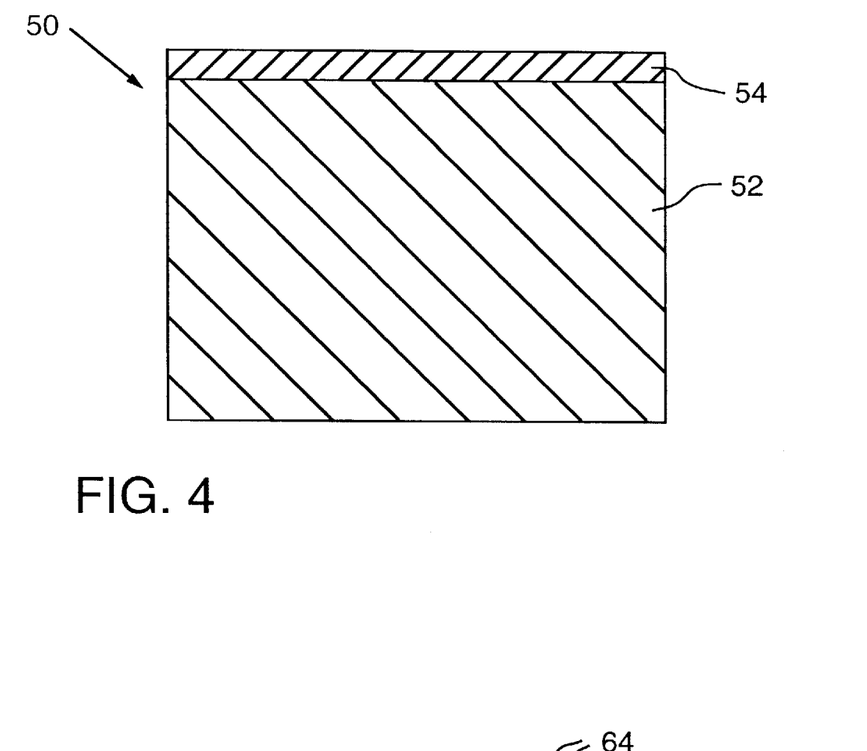
FIG. 4 is a partially schematic cross-sectional view of a mirror bezel in accordance with an embodiment of the present invention.

In one embodiment, the bezel comprises a substrate having at least one coating layer thereon which provides the desired lightness value. FIG. 4 schematically illustrates a cross section of such a bezel 50 comprising a substrate 52 and a coating 54. In this case, the substrate is preferably a metal or a plastic such as ASA/PC, ABS/PC, PC, ABS, PA or PPO, while the coating may comprise electro-plating, adhesive film, in-molded film, dipped, sprayed, pad-painted or roll-applied coatings or the like. Metals such as chrome and/or nickel may be plated on the substrate. Alternatively, the coating may comprise at least one layer of paint. Suitable paint compositions may be based on alkyd, acrylic, epoxy, polyester, powder or high solids compositions, which may be sprayed, brushed, dipped or otherwise applied to the bezel substrate.

As a particular example, a film having selected visual characteristics, such as Flourex In-Mold Paint Film available from Rexam Weatherable Films, may be placed into an injection mold. The mold is closed and a thermoplastic or thermoset plastic is injection molded to the rear surface of the paint film. The part is then ejected or removed from the mold with the paint film forming the visible outer surface of the mirror bezel. Alternately, the bezel may be formed by injection molding the part in a conventional manner, without the final finish, and the finish can be applied using a paint dip process, or sprayed, brushed, plated, rolled, or dip applied to the visible outer surface.

Figure 5:
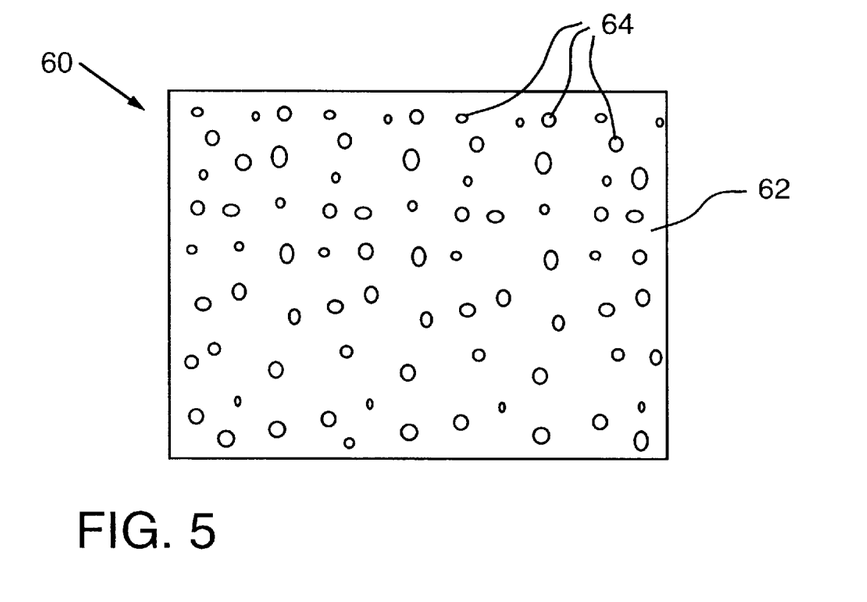
FIG. 5 is a partially schematic cross-sectional view of a mirror bezel in accordance with another embodiment of the present invention.

In another embodiment, the bezel may comprise a substrate having particles dispersed therein which provide the desired lightness values. FIG. 5 schematically illustrates a cross section of such a bezel 60 comprising a substrate 62 having particles 64 dispersed therein. Particles such as standard pigments, metallic pigments, $TiO_2$ and the like may be used. Suitable pigments and coloring agents include Chrome Yellow from CIBA, Zinc Chrome from Davis or MPC, Special Black from DeGussa, Red Oxide from Hoover, Special Silver from Silberline, Burnt Umber from Hoover, Metallic Brown from Pfizer, Yellow Oxide and Phthalo Blue from Accurate. Such particles may be included in preferred amounts of from about 10 to about 80 weight percent in the bezel substrate. In this embodiment, the bezel substrate preferably comprises plastic such as ASA/PC, ABS/PC, PC, ABS, PA or PPO.

The following example is intended to illustrate various aspects of the present invention, and is not intended to limit the scope of the invention.

EXAMPLE

Samples of bezel coatings in accordance with the present invention were compared with a sample of ABS/PC black plastic (Sample No. 1) sold under the designation Bayer T-84 which is conventionally used for rearview mirror bezels. The samples are also compared with an electrochromic mirror element in a high reflectance mode. Four color samples (Sample Nos. 2–5) were created for color matching to the electrochromic mirror element. Each sample comprised an ABS/PC (Bayer T-84) mirror bezel substrate. Three of the samples (Sample Nos. 2–4) were painted with a black spray coating, then sprayed with Senocryl Chrome paint available from Weilberger, and finally a two-part clear urethane sold under the designation 317 by Red Spot Paint and Finish Company was sprayed on the samples. Prior to spraying, the clear urethane was mixed with various amounts of lacquer-base black pigment sold under the designation 406L by DuPont High Performance Coatings. Sample No. 2 comprised 5 percent black pigment and 95 percent clear urethane; Sample No. 3 comprised 10 percent black pigment and 90 percent clear urethane; and Sample No. 4 comprised 20 percent black pigment and 80 percent clear urethane. A 3 inch×5 inch plaque was painted with the same coating and process to match each bezel for color measurement. Another sample (Sample No. 5) also comprising an ABS/PC Bayer T-84 mirror bezel substrate was prepared. After molding, this sample was cleaned, acid etched, rinsed and neutralized. The surface was then exposed to a catalyst, a rinse, an accelerator, rinsed, and electroless plated with a conductive copper finish in preparation for a chrome electrodeposition process. The part was then acid etched again, rinsed and immersed in an electroplating tank while electrically charged to attract a nickel-chrome plating to the exposed surface. Sample No. 6 comprised an electrochromic mirror element in the high reflectance mode, commercially available from Gentex Corporation. The samples were then tested with a HunterLab ColorQuest Spectrophotometer, CIELAB L*A*B*, D65 Illuminant, 10 degree Observer, Specular Included. The CIELAB test results for the samples are shown below in Table 1.

TABLE 1

CIELAB Test Results

| Sample No. | L* | a* | b* | ΔE |
|---|---|---|---|---|
| 1 | 25.77 | −0.13 | −0.62 | 53.92 |
| 2 | 65.67 | 0.03 | 2.27 | 40.50 |
| 3 | 58.65 | 0.22 | 3.13 | 32.75 |
| 4 | 52.39 | 0.64 | 4.43 | 26.09 |
| 5 | 82.67 | −0.81 | −0.45 | 6.90 |
| 6 | 79.31 | −2.43 | 5.35 | — |

L* is lightness value on a scale of 0 (black) to 100 (white).
a* is red/green value on a scale of −60 (green) to +60 (red).
b* is yellow/blue value on a scale of -60 (blue) to +60 (yellow).
ΔE is the total difference in lightness value and color values of each of Samples 1–5 compared with Sample 6; $\Delta E = (\Delta L^{*2} + \Delta a^{*2} + \Delta b^{*2})^{1/2}$.

Figure 6:
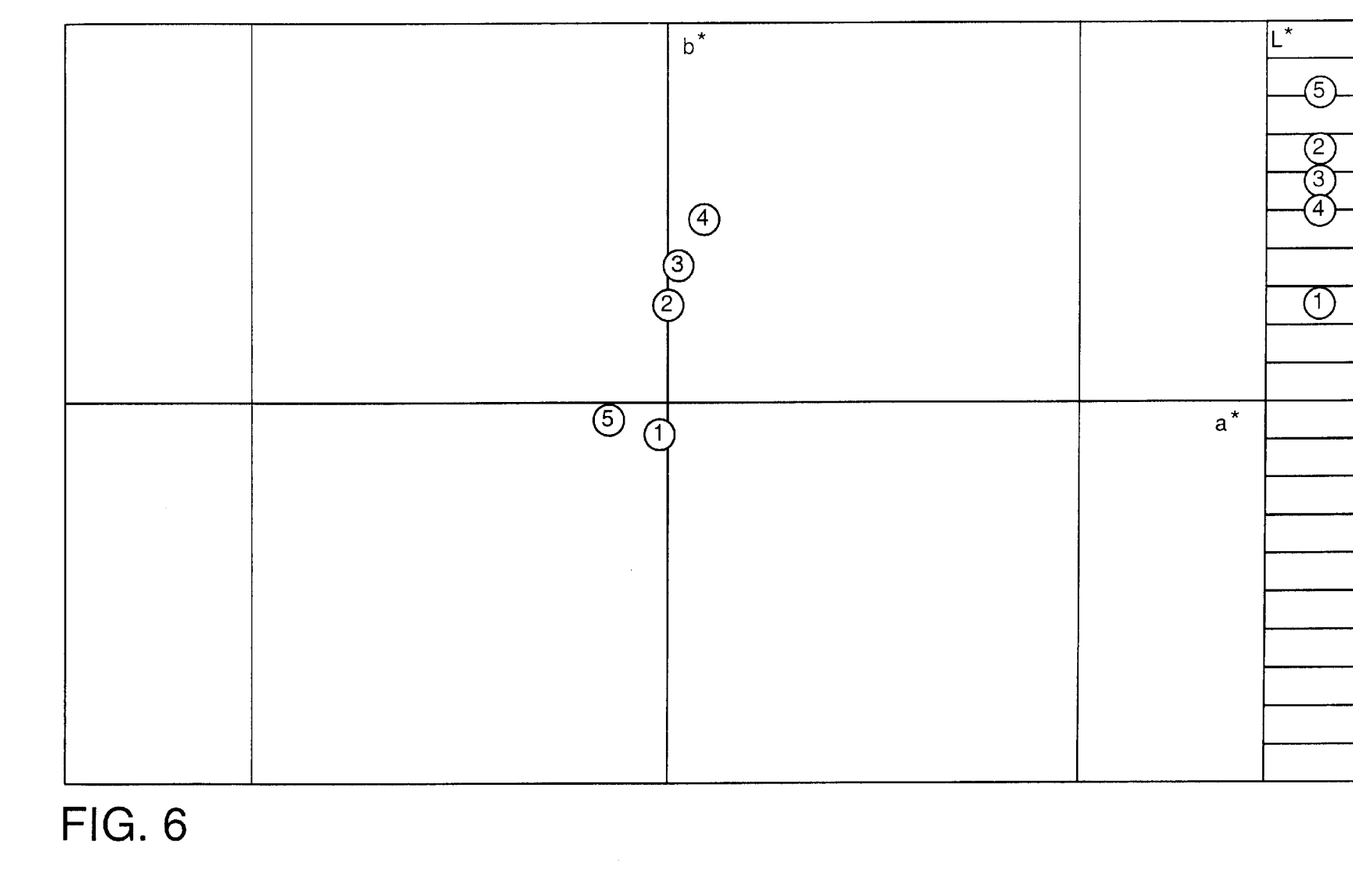
FIG. 6 is a plot showing color values and lightness values of reduced apparent size rearview mirror bezel coatings of the present invention in comparison with a conventional rearview mirror bezel material.

The CIELAB L*, a* and b* values of the Samples 1–5 listed in Table 1 are graphically illustrated in FIG. 6.

The L*A*B* results shown in Table 1 and FIG. 6 show the deviation of a conventional black bezel (Sample No. 1) and samples of the present invention (Sample Nos. 2–5) from the lightness value of an electrochromic mirror element in the high reflectance mode (Sample No. 6). The lightness values L* of Samples 2–5 were substantially higher than the black sample, although the a and b values did not deviate substantially from those of the black bezel. Furthermore, the lightness values L* of Samples 2–5 closely matched the lightness value L* of the electrochromic mirror assembly.

Whereas particular embodiments of this invention have been described above for purposes of illustration, it will be evident to those skilled in the art that numerous variations of the details of the present invention may be made without departing from the invention as defined in the appended claims.

What is claimed is:

1. An electrochromic rearview mirror comprising:
   a variable reflectance electrochromic mirror assembly having first and second elements, said electrochromic mirror assembly switchable from a high reflectance mode to at least one reduced reflectance mode;
   a seal member between said first and second elements; and
   a reduced apparent size bezel having a controlled CIELAB lightness value L* of from about 30 to about 100 at least partially surrounding the electrochromic mirror assembly, wherein said bezel extends around the edge of said electrochromic mirror and comes into contact with said electrochromic mirror so that said seal member is substantially hidden from view, and said bezel comprises at least one of a substrate or coating having particles dispersed therein or thereon to provide said controlled lightness value.

2. The electrochromic rearview mirror of claim 1, wherein the bezel has a lightness value L* of from about 40 to about 90.

3. The electrochromic rearview mirror of claim 1, wherein the bezel has a lightness value L* of from about 50 to about 80.

4. The electrochromic rearview mirror of claim 1, wherein the lightness value L* of the bezel substantially matches a lightness value L* of the electrochromic mirror assembly in at least one of the high reflectance and reduced reflectance modes.

5. The electrochromic rearview mirror of claim 4, wherein the lightness value L* of the bezel substantially matches the lightness value of the electrochromic mirror assembly in the high reflectance mode.

6. The electrochromic rearview mirror of claim 4, wherein the lightness value L* of the electrochromic mirror assembly in the high reflectance mode is from about 75 to about 96.

7. The electrochromic rearview mirror of claim 4, wherein the lightness value L* of the electrochromic mirror assembly in the at least one reduced reflectance mode is from about 25 to about 54.

8. The electrochromic rearview mirror of claim 4, wherein a maximum difference between the lightness value L* of the bezel and the lightness value L* of the electrochromic mirror assembly in the high reflectance mode is less than about 35.

9. The electrochromic rearview mirror of claim 4, wherein a maximum difference between the lightness value L* of the bezel and the lightness value L* of the electrochromic mirror assembly in the high reflectance mode is less than about 30.

10. The electrochromic rearview mirror of claim 4, wherein a maximum difference between the lightness value L* of the bezel and the lightness value L* of the electrochromic mirror assembly in the high reflectance mode is less than about 20.

11. The electrochromic rearview mirror of claim 4, wherein a maximum difference between the lightness value L* of the bezel and the lightness value L* of the electrochromic mirror assembly in the high reflectance mode is less than about 10.

12. The electrochromic rearview mirror of claim 4, wherein a maximum difference between the lightness value L* of the bezel and the lightness value L* of the electrochromic mirror assembly in the high reflectance mode is less than about 5.

13. The electrochromic rearview mirror of claim 4, wherein a ratio of the lightness value L* of the bezel and the lightness value L* of the electrochromic mirror assembly in the high reflectance mode is from about 0.6:1 to about 1.3:1.

14. The electrochromic rearview mirror of claim 4, wherein a ratio of the lightness value L* of the bezel and the lightness value L* of the electrochromic mirror assembly in the high reflectance mode is from about 0.8:1 to about 1:1.

15. The electrochromic rearview mirror of claim 1, wherein the reduced apparent size bezel has a red/green color value a* of from about −10 to about +10, and a yellow/blue color value b* of from about −10 to about +10.

16. The electrochromic rearview mirror of claim 15, wherein the red/green color value a* is from about −5 to about +5, and the yellow/blue color value b* is from about −5 to +5.

17. The electrochromic rearview mirror of claim 1, wherein the reduced apparent size bezel has a red/green color value a* of less than about −10.

18. The electrochromic rearview mirror of claim 1, wherein the reduced apparent size bezel has a red/green color value a* of greater than about +10.

19. The electrochromic rearview mirror of claim 1, wherein the reduced apparent size bezel has a yellow/blue color value b* of less than about −10.

20. The electrochromic rearview mirror of claim 1, wherein the reduced apparent size bezel has a yellow blue color value b* of greater than about +10.

21. The electrochromic rearview mirror of claim 1, wherein the bezel has a red/green color value a* and a yellow blue color value b* which substantially match a red/green color value a* and a yellow/blue color value b* of the electrochromic mirror assembly.

22. The electrochromic rearview mirror of claim 21, wherein the red/green color value a* and yellow/blue color value b* of the bezel substantially match the red/green color value a* and yellow/blue color value b* of the electrochromic rearview mirror assembly in the high reflectance mode.

23. The electrochromic rearview mirror of claim 1, wherein the variable reflectance electrochromic mirror assembly comprises a chamber defined by a front transparent element, a rear element spaced from the front transparent element and a sealing member between facing surfaces of the front and rear elements extending around peripheries of the facing surfaces, and the bezel extends over an exterior surface of the front transparent element a sufficient distance to at least partially conceal the seal when the electrochromic mirror is viewed through the exterior surface of the front transparent element.

24. The electrochromic rearview mirror of claim 23, wherein the front transparent element and rear element are non-coextensive and define an offset which is covered by the bezel.

25. The electrochromic rearview mirror of claim 1, wherein the bezel has a total width of from about 4 to about 8 mm.

26. The electrochromic rearview mirror of claim 1, wherein the bezel comprises a substrate coated with at least one layer of material having said controlled lightness value.

27. The electrochromic rearview mirror of claim 26, wherein the substrate comprises at least one plastic selected from the group comprising ASA, ABS, PC, PA and PPO.

28. The electrochromic rearview mirror of claim 1, wherein the bezel comprises a substrate having particles dispersed therein to provide said controlled lightness value.

29. The electrochromic rearview mirror of claim 1, wherein the rearview mirror is adapted for mounting in an interior of a vehicle.

30. The electrochromic rearview mirror of claim 1, wherein the rearview mirror is adapted for mounting on an exterior of a vehicle.

31. An electrochromic rearview mirror comprising:
a variable reflectance electrochromic mirror assembly having first and second elements, said electrochromic mirror assembly switchable from a high reflectance mode to at least one reduced reflectance mode;
a seal member between said first and second elements; and
a reduced apparent size bezel at least partially surrounding the electrochromic mirror assembly, wherein a CIELAB lightness value L* of the bezel substantially matches a CIELAB lightness value L* of the electrochromic mirror assembly in at least one of the high reflectance and reduced reflectance modes, said bezel extends around the edge of said electrochromic mirror and comes into contact with said electrochromic mirror so that said seal member is substantially hidden from view, and said bezel comprises at least one of a substrate or coating having particles dispersed therein or thereon to provide said lightness value of said bezel.

32. The electrochromic rearview mirror of claim 31, wherein the bezel has a lightness value L* of from about 30 to about 100.

33. The electrochromic rearview mirror of claim 31, wherein the bezel has a lightness value L* of from about 40 to about 90.

34. The electrochromic rearview mirror of claim 31, wherein the bezel has a lightness value L* of from about 50 to about 80.

35. The electrochromic rearview mirror of claim 31, wherein the lightness value L* of the bezel substantially matches the lightness value of the electrochromic mirror assembly in the high reflectance mode.

36. The electrochromic rearview mirror of claim 31, wherein the lightness value L* of the electrochromic mirror assembly in the high reflectance mode is from about 75 to about 96.

37. The electrochromic rearview mirror of claim 31, wherein the lightness value L* of the electrochromic mirror assembly in the at least one reduced reflectance mode is from about 25 to about 54.

38. The electrochromic rearview mirror of claim 31, wherein a maximum difference between the lightness value L* of the bezel and the lightness value L* of the electrochromic mirror assembly in the high reflectance mode is less than about 35.

39. The electrochromic rearview mirror of claim 31, wherein a maximum difference between the lightness value L* of the bezel and the lightness value L* of the electrochromic mirror assembly in the high reflectance mode is less than about 30.

40. The electrochromic rearview mirror of claim 31, wherein a maximum difference between the lightness value L* of the bezel and the lightness value L* of the electrochromic mirror assembly in the high reflectance mode is less than about 20.

41. The electrochromic rearview mirror of claim 31, wherein a maximum difference between the lightness value L* of the bezel and the lightness value L* of the electrochromic mirror assembly in the high reflectance mode is less than about 10.

42. The electrochromic rearview mirror of claim 31, wherein a maximum difference between the lightness value L* of the bezel and the lightness value L* of the electrochromic mirror assembly in the high reflectance mode is less than about 5.

43. The electrochromic rearview mirror of claim 31, wherein a ratio of the lightness value L* of the bezel and the lightness value L* of the electrochromic mirror assembly in the high reflectance mode is from about 0.6:1 to about 1.3:1.

44. The electrochromic rearview mirror of claim 31, wherein a ratio of the lightness value L* of the bezel and the lightness value L* of the electrochromic mirror assembly in the high reflectance mode is from about 0.8:1 to about 1:1.

45. The electrochromic rearview mirror of claim 31, wherein the reduced apparent size bezel has a red/green color value a* of from about −10 to about +10, and a yellow/blue color value b* of from about −10 to about +10.

46. The electrochromic rearview mirror of claim 31, wherein the red/green color value a* is from about −5 to about +5, and the yellow/blue color value b* is from about −5 to +5.

47. The electrochromic rearview mirror of claim 31, wherein the reduced apparent size bezel has a red/green color value a* of less than about −10.

48. The electrochromic rearview mirror of claim 31, wherein the reduced apparent size bezel has a red/green color value a* of greater than about +10.

49. The electrochromic rearview mirror of claim 31, wherein the reduced apparent size bezel has a yellow/blue color value b* of less than about −10.

50. The electrochromic rearview mirror of claim 31, wherein the reduced apparent size bezel has a yellow blue color value b* of greater than about +10.

51. The electrochromic rearview mirror of claim 31, wherein the bezel has a red/green color value a* and a yellow blue color value b* which substantially match a red/green color value a* and a yellow/blue color value b* of the electrochromic mirror assembly.

52. The electrochromic rearview mirror of claim 31, wherein the red/green color value a* and yellow/blue color value b* of the bezel substantially match the red/green color value a* and yellow/blue color value b* of the electrochromic rearview mirror assembly in the high reflectance mode.

53. The electrochromic rearview mirror of claim 31, wherein the variable reflectance electrochromic mirror assembly comprises a chamber defined by a front transparent element, a rear element spaced from the front transparent element and a sealing member between facing surfaces of the front and rear elements extending around peripheries of the facing surfaces, and the bezel extends over an exterior surface of the front transparent element a sufficient distance to at least partially conceal the seal when the electrochromic mirror is viewed through the exterior surface of the front transparent element.

54. The electrochromic rearview mirror of claim 53, wherein the front transparent element and rear element are non-coextensive and define an offset which is covered by the bezel.

55. The electrochromic rearview mirror of claim 31, wherein the bezel has a total width of from about 4 to about 8 mm.

56. The electrochromic rearview mirror of claim 31, wherein the bezel comprises a substrate coated with at least one layer of material having said controlled lightness value.

57. The electrochromic rearview mirror of claim 56, wherein the substrate comprises at least one plastic selected from the group comprising ASA, ABS, PC, PA and PPO.

58. The electrochromic rearview mirror of claim 31, wherein the bezel comprises a substrate having particles dispersed therein to provide said controlled lightness value.

59. The electrochromic rearview mirror of claim 31, wherein the rearview mirror is adapted for mounting in an interior of a vehicle.

60. The electrochromic rearview mirror of claim 31, wherein the rearview mirror is adapted for mounting on an exterior of a vehicle.

* * * * *

UNITED STATES PATENT AND TRADEMARK OFFICE
CERTIFICATE OF CORRECTION

PATENT NO. : 6,102,546
DATED : August 15, 2000
INVENTOR(S) : John W. Carter

It is certified that error appears in the above-identified patent and that said Letters Patent is hereby corrected as shown below:

Column 7,
The symbol in the last line of text after Table 1 should read
-- $(\Delta L^{*2} + \Delta a^{*2} + \Delta b^{*2})^{½}$. --

Signed and Sealed this

Fourth Day of December, 2001

*Attest:*

*Attesting Officer*

NICHOLAS P. GODICI
*Acting Director of the United States Patent and Trademark Office*